Patented Jan. 26, 1954

2,667,465

UNITED STATES PATENT OFFICE 2,667,465

MOLDING COMPOSITION

Robert J. Nebesar, Bristol, Tenn., assignor to Universal Moulded Products Corporation, Bristol, Va., a corporation of Delaware No Drawing. Application July 12, 1951,
Serial No. 236,455

6 Claims. (Cl. 260—40)

This invention relates to molding compositions and more particularly to such compositions which utilize synthetic resins together with fillers.

It is known in the art to make a molding composition consisting of a synthetic resin and a filler of glass fibers. A product molded from this composition has weak spots which are subject to cracking and crazing during molding and under hard usage. These weak spots result due to the random distribution of the glass fibers which leaves portions of the product where there is mere resin unsupported by any fibers.

Aside from the weak spots and cracks, a product formed from molding a synthetic resin filled with glass fibers is an exceptionally strong satisfactory product, which, of course, has excellent dielectric properties and is resistant to chemical action depending, of course, on the selection of suitable resins.

It is, therefore, an object of this invention to provide a molding composition which may be used to form a strong inert product with good dielectric properties.

An additional object of this invention is to provide a molding composition comprising a synthetic resin and a fiber glass filler which may be molded into a strong product which will not crack during molding or subsequently.

The molding composition in accordance with this invention comprises a synthetic resin, glass fibers and asbestos.

It has been found desirable to use the following proportions by weight:

|  | Percent |
|---|---|
| Glass fibers | 40–50 |
| Synthetic resin | 45–55 |
| Asbestos | 5–15 |

The glass fibers will be about one-half inch to about two inches in length. The asbestos fibers will preferably be about one-thirty-second of an inch long, being at that length of the nature of a powder and not over about one-eighth of an inch in length.

In exceptional instances the percentage of glass fibers may be as low as 35% and as high as 60% and the percentage of synthetic resin may be as low as 37% and as high as 62%, but their combined percentage should not exceed 97% or be less than 80%. The percentage of asbestos fibers should rarely be less than 5%, although a percentage as low as 3% gives considerable resistance to cracking. The percentage of asbestos fibers should rarely exceed 10–15%, but a somewhat higher percentage, not exceeding 20%, is permissible. Such high percentage of asbestos fibers is, however, unnecessary to insure against cracking. The improved composition does not exclude the inclusion in any minor proportion of other constituents, but the addition of any other constituent is wholly unnecessary to produce a product having the properties which characterize my improved product.

As exemplary of synthetic thermoplastic resins which may be used is a polystyrene. A polydichlorostyrene which is transparent or semitransparent and resistant to the action of chemicals may also be used.

As exemplary of synthetic thermosetting resins which may be used is a polyester resin such as a composition comprising a substantially linear polyhydric alcohol ester of an unsaturated polybasic acid material of the maleic type and a substituted-ethylene body of resins, forming characteristics which are copolymerizible and miscible with the polyhydric alcohol ester. Thus, for example, the composition may be diethylene glycol maleate or diethylene glycol fumarate having incorporated therewith vinyl acetate, amylacrylate, or vinyl chloride. The curing of such a maleic substituted ethylene composition will be accelerated by using a curing catalyst such as benzoyl peroxide, phthalyl peroxide or air blown dioxane. Such thermosetting resins are well known in the art and reference may be made to Patent 2,255,313, issued September 9, 1941 to Carleton Ellis for further information relative to them.

In forming the molding composition, the asbestos fibers are first mixed with the synthetic resin and the asbestos fibers evenly distributed throughout the synthetic resin. The glass fibers may then be added and distributed as evenly as possible to complete the formation of the molding composition.

The molding composition in accordance with this invention may be molded under conditions of heat and pressure dictated by the synthetic resin selected. Generally, however, the product would be formed at a temperature of from about 200° F. to about 280° F. at a pressure of about three thousand pounds per square inch.

The following specific examples are further illustrative of the molding composition in accordance with this invention:

EXAMPLE 1

|  | Percent By Weight | Length, inches |
|---|---|---|
| Glass Fibers | 49 | ½ |
| Asbestos | 10 | ¹⁄₃₂ |
| Diethylene Glycol Maleate Vinyl Acetate Copolymer | 41 |  |

EXAMPLE 2

| | Percent By Weight | Length, inches |
|---|---|---|
| Glass Fibers | 49 | 1½ |
| Asbestos | 10 | 1/64 |
| Diethylene Glycol Maleate Vinyl Acetate Copolymer | 41 | |

EXAMPLE 3

| | Percent By Weight | Length, inches |
|---|---|---|
| Glass Fibers | 49 | ½ |
| Asbestos | 10 | ⅛ |
| Diethylene Glycol Fumarate Vinyl Chloride Copolymer | 41 | |

EXAMPLE 4

| | Percent By Weight | Length, inches |
|---|---|---|
| Glass Fibers | 49 | 1½ |
| Asbestos | 10 | 1/32 |
| Diethylene Glycol Fumarate Vinyl Acetate Copolymer | 41 | |

EXAMPLE 5

| | Percent By Weight | Length, inches |
|---|---|---|
| Glass Fibers | 51 | ½ |
| Asbestos | 5 | ⅛ |
| Diethylene Glycol-Maleate Vinyl Acetate Copolymer | 44 | |

EXAMPLE 6

| | Percent By Weight | Length, inches |
|---|---|---|
| Glass Fibers | 51 | 1½ |
| Asbestos | 5 | 1/64 |
| Diethylene Glycol Maleate Vinyl Acetate Copolymer | 44 | |

EXAMPLE 7

| | Percent By Weight | Length, inches |
|---|---|---|
| Glass Fibers | 35 | ½ |
| Asbestos | 15 | ⅛ |
| Polydichlorostyrene | 50 | |

EXAMPLE 8

| | Percent By Weight | Length, inches |
|---|---|---|
| Glass Fibers | 55 | 1 |
| Asbestos | 5 | 1/16 |
| Polydichlorostyrene | 40 | |

EXAMPLE 9

| | Percent By Weight | Length, inches |
|---|---|---|
| Glass Fibers | 43 | ½ |
| Asbestos | 20 | ⅛ |
| Polydichlorostyrene | 37 | |

EXAMPLE 10

| | Percent By Weight | Length, inches |
|---|---|---|
| Glass Fibers | 35 | 2 |
| Asbestos | 3 | 1/64 |
| Polydichlorostyrene | 62 | |

EXAMPLE 11

| | Percent By Weight | Length, inches |
|---|---|---|
| Glass Fibers | 60 | ¾ |
| Asbestos | 3 | 1/32 |
| Polydichlorostyrene | 37 | |

EXAMPLE 12

| | Percent By Weight | Length, inches |
|---|---|---|
| Glass Fibers | 35 | ½ |
| Asbestos | 15 | ⅛ |
| Diethylene Glycol Maleate Amylacrylate Copolymer | 50 | |

EXAMPLE 13

| | Percent By Weight | Length, inches |
|---|---|---|
| Glass Fibers | 55 | 1 |
| Asbestos | 5 | 1/16 |
| Diethylene Glycol Maleate Amylacrylate Copolymer | 40 | |

EXAMPLE 14

| | Percent By Weight | Length, inches |
|---|---|---|
| Glass Fibers | 43 | ½ |
| Asbestos | 20 | ⅛ |
| Diethylene Glycol Maleate Amylacrylate Copolymer | 37 | |

EXAMPLE 15

| | Percent By Weight | Length, inches |
|---|---|---|
| Glass Fibers | 35 | 2 |
| Asbestos | 3 | 1/64 |
| Diethylene Glycol Maleate Amylacrylate Copolymer | 62 | |

EXAMPLE 16

| | Percent By Weight | Length, inches |
|---|---|---|
| Glass Fibers | 60 | ¾ |
| Asbestos | 3 | 1/32 |
| Diethylene Glycol Maleate Amylacrylate Copolymer | 37 | |

The molding composition in accordance with this invention is advantageous since its use forms a structure which is not subject to the disadvantages discussed above, that is, it does not have weak spots which are subject to cracking or crazing.

Heretofore, we noted that, where the molding composition consisted of glass fibers and a resin, there existed in the molded product portions which were not filled with glass fibers, that is, spots formed by the resin alone. Where a molded product is formed from the molding composition of this invention, such spots, which are unfilled with the glass fibers, comprise not resin alone, but resin admixed with an asbestos filler. These spots have a strong resistance to cracking. Thus, a product molded from the molding composition of this invention is of superior strength and, being highly resistant to cracking, forms a far more suitable product for many uses, such as, for example, acid containers.

This application is a continuation-in-part of my application Serial No. 73,213, filed January 27, 1949 now abandoned.

What is claimed is:

1. A molding composition which comprises a reaction product of an unsaturated polybasic acid and a polyhydric alcohol; said reaction product having incorporated therewith a member selected from the group consisting of vinyl acetate, vinyl chloride and amyl acrylate; said reaction product and said members together being from 37 to 62% by weight of the composition and being evenly distributed throughout the composition; asbestos fibers of a length not exceeding one-eighth of an inch; and distributed in said mixture from 35 to 60% by weight of glass fibers of a length of from about one-half inch to about two inches, the asbestos fibers being in a proportion not less than 3% and permissibly as high as but not over 20% by weight, and sufficient to support the resin throughout and thereby eliminate weak spots subject to cracking or crazing in loci of the molded product that are unsupported by the glass fibers in random distribution.

2. A molding composition which comprises a reaction product of an unsaturated dibasic acid and a dihydric alcohol; said reaction product having incorporated therewith a member selected from the group consisting of vinyl acetate, vinyl chloride and amylacrylate; said reaction product and said members together being from 37 to 62% by weight of the composition and being evenly distributed throughout the composition; asbestos fibers of a length not exceeding one-eighth of an inch; and distributed in said mixture from 35 to 60% by weight of glass fibers of a length of from about one-half inch to about two inches, the asbestos fibers being in a proportion not less than 3% and permissibly as high as but not over 20% by weight, and sufficient to support the resin throughout and thereby eliminate weak spots subject to cracking or crazing in loci of the molded product that are unsupported by the glass fibers in random distribution.

3. A molding composition in accordance with claim 2 in which the reaction product is diethylene glycol maleate and the selected member is vinyl acetate.

4. A molding composition in accordance with claim 2 in which the reaction product is diethylene glycol fumarate and the selected member is vinyl chloride.

5. A molding composition in accordance with claim 2 in which the reaction product is diethylene glycol fumarate and the selected member is vinyl acetate.

6. A molding composition in accordance with claim 2 in which the reaction product is diethylene glycol maleate and the selected member is amylacrylate.

ROBERT J. NEBESAR.

References Cited in the file of this patent

UNITED STATES PATENTS

| Number | Name | Date |
|---|---|---|
| 2,388,293 | Schroy et al. | Nov. 6, 1945 |